(12) United States Patent
Makley et al.

(10) Patent No.: US 11,574,295 B2
(45) Date of Patent: Feb. 7, 2023

(54) SYSTEM, APPARATUS AND ARTICLE OF MANUFACTURE FOR MOVEABLE BAGGING SYSTEMS IN SELF-CHECKOUT SYSTEMS

(71) Applicant: Toshiba Global Commerce Solutions Holdings Corporation, Tokyo (JP)

(72) Inventors: Hye Suk Makley, Morrisville, NC (US); Robert Andrew Myers, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 253 days.

(21) Appl. No.: 16/274,523

(22) Filed: Feb. 13, 2019

(65) Prior Publication Data
US 2020/0258068 A1    Aug. 13, 2020

(51) Int. Cl.
*G06Q 20/00*    (2012.01)
*G06Q 20/20*    (2012.01)
*B25J 18/02*    (2006.01)

(52) U.S. Cl.
CPC .......... *G06Q 20/208* (2013.01); *B25J 18/025* (2013.01)

(58) Field of Classification Search
CPC .............................. G06Q 20/208; G06M 1/272
USPC ...................................................... 705/16, 23
See application file for complete search history.

(56) References Cited

U.S. PATENT DOCUMENTS

| | | | |
|---|---|---|---|
| 4,350,004 A | 9/1982 | Tsujimoto et al. | |
| 4,953,664 A | 9/1990 | Vrooman et al. | |
| 5,020,323 A * | 6/1991 | Hurlimann | F16M 11/28 414/718 |
| 5,167,301 A | 12/1992 | Cappi et al. | |
| 5,836,470 A | 11/1998 | Neelly et al. | |
| 6,349,526 B1 * | 2/2002 | Newman | B07C 5/10 53/143 |
| 6,550,226 B1 | 4/2003 | Gates et al. | |
| 6,550,583 B1 * | 4/2003 | Brenhouse | A47F 9/048 186/61 |
| 7,255,271 B2 | 8/2007 | Ulrich et al. | |
| 7,370,730 B2 | 5/2008 | Johnson et al. | |
| 7,516,820 B1 | 4/2009 | Cox et al. | |

(Continued)

FOREIGN PATENT DOCUMENTS

WO    WO2017/218609    12/2017

OTHER PUBLICATIONS

U-Scan Genesis Self-Checkout Systems; Fujitsu Transaction Solutions Inc.; us.fujitsu.com/retailing; (2008); 4 pages.

*Primary Examiner* — Rokib Masud
(74) *Attorney, Agent, or Firm* — Stanek Lemon Crouse & Meeks, PA (57) ABSTRACT

A self-checkout system can include a plurality of telescoped bagging arm segments moveably coupled together in an order according to respective diameters of the plurality of telescoped bagging arm segments. A scanning system can be configured to provide a characteristic of an item purchased by a user of the self-checkout system and a processor circuit can be operatively coupled to the plurality of telescoped bagging arm segments and to the scanning system, where the processor circuit can be configured to move the plurality of telescoped bagging arm segments relative to one another based on the characteristic of the item to be placed in a bag in use with the self-checkout system.

20 Claims, 7 Drawing Sheets

(56) References Cited

U.S. PATENT DOCUMENTS

| | | | |
|---|---|---|---|
| 7,861,500 B2* | 1/2011 | Bennett | B65B 9/14 |
| | | | 53/567 |
| 8,825,531 B1* | 9/2014 | Catoe | G07G 1/0018 |
| | | | 705/16 |
| 9,622,599 B2 | 4/2017 | Davis | |
| 10,029,815 B2 | 7/2018 | Robinson et al. | |
| 10,081,496 B2 | 9/2018 | Bacallao et al. | |
| 2003/0029141 A1* | 2/2003 | Townsend | B65B 43/465 |
| | | | 493/180 |
| 2005/0006176 A1* | 1/2005 | Kurtz | G06Q 20/202 |
| | | | 186/59 |
| 2005/0114216 A1 | 5/2005 | Lantz et al. | |
| 2007/0080219 A1* | 4/2007 | Garver | G06Q 20/20 |
| | | | 235/383 |
| 2008/0110132 A1* | 5/2008 | Yan Ruz | B65B 43/30 |
| | | | 53/385.1 |
| 2008/0229717 A1* | 9/2008 | Koke | B65B 25/065 |
| | | | 53/468 |
| 2013/0320083 A1* | 12/2013 | Hammer | G07G 1/0045 |
| | | | 235/462.43 |
| 2014/0180479 A1* | 6/2014 | Argue | B65B 5/105 |
| | | | 901/47 |
| 2015/0041483 A1* | 2/2015 | Natarajan | G06M 1/272 |
| | | | 221/1 |

* cited by examiner

SYSTEM, APPARATUS AND ARTICLE OF MANUFACTURE FOR MOVEABLE BAGGING SYSTEMS IN SELF-CHECKOUT SYSTEMS

FIELD

The present invention relates to the field of point of sale systems in general, and more particularly, to bagging systems for point of sale systems.

BACKGROUND

Self-checkout systems are commonly used by consumers at retail locations such as grocery stores. In operation, the user can scan items at the self-checkout system and place the scanned items into a bag located on a scale of the self-checkout system. When the item is scanned, the self-checkout system accesses data that indicates information about the scanned item, such as a specified weight. The self-checkout system can then compare the specified weight with the measured weight provided by the scale. In this way, the self-checkout system can verify that the scanned items are the ones placed into the bag.

SUMMARY

Embodiments according to the present invention can provide a system, apparatus and article of manufacture for moveable bagging systems in self-checkout systems. Pursuant to these embodiments, a self-checkout system can include a plurality of telescoped bagging arm segments moveably coupled together in an order according to respective diameters of the plurality of telescoped bagging arm segments. A scanning system can be configured to provide a characteristic of an item purchased by a user of the self-checkout system and a processor circuit can be operatively coupled to the plurality of telescoped bagging arm segments and to the scanning system, where the processor circuit can be configured to move the plurality of telescoped bagging arm segments relative to one another based on the characteristic of the item to be placed in a bag in use with the self-checkout system.

In some embodiments according to the present invention, a bagging system apparatus can include a plurality of bagging arm segments moveably coupled together and a plurality of retaining protrusions, wherein a respective one of the plurality of retaining protrusions protrudes vertically from a respective one of the plurality of bagging arm segments. An actuator can be operatively coupled to the plurality of bagging arm segments and can be configured to move the plurality of bagging arm segments horizontally, responsive to characteristics of items stored in a memory, during a self-checkout process.

In some embodiments according to the present invention, a non-transitory computer-readable medium whose contents, when executed by a computing system, can cause the computing system to perform operations for a self-checkout bagging system that can include receiving a characteristic of an item scanned by a user of a self-checkout system for placement into a bag during a self-checkout process and providing an instruction to actuate a plurality of bagging arm segments linearly to move the bag from a bagging position to allow the user to deploy a new bag at the bagging position responsive to the characteristic received during the self-checkout process.

DETAILED DESCRIPTION OF EMBODIMENTS ACCORDING TO THE INVENTION

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As described herein in greater detail, a self-checkout system can include a plurality of bagging arm segments that can be moved by a processor circuit based on characteristics associated with the items scanned. In some embodiments according to the invention, the characteristics that can influence the movement of the bagging arm segments include the weight of an item that is scanned, the "bulkiness" (for example, the maximum dimension) of an item that is scanned, the volume of the item scanned, a count of the items scanned or a combination of any of these characteristics. Moreover, the characteristics of the scanned items (to be placed in a bag) can be aggregated together to determine whether a new bag may be needed, whereupon the current bag may be moved away from the bagging positon to allow the user to place a new bag at the bagging position. For example, in operation, the processor circuit may maintain a record of the items that are scanned and stored in a particular bag on the scale so that the processor circuit may make an accurate determination as to whether the new bag should be used for the item being scanned or that the scanned item should be placed in the current bag. If a user has bagged a certain number or type of items which would indicate that another bag should be used for the next item to be scanned, the processor circuit can cause the bag currently being loaded in the bagging position to be moved away from the bagging position so the user can place a new bag at the bagging position and place the at scanned item into the new bag. This process can repeated until all of the items have been scanned and bagged (i.e., the self-checkout process has been competed).

It will be understood that in some embodiments according to the invention, a particular bag used the by self-checkout system can have known characteristics such as the maximum capacity for which the bag can safely be used. For example, a particular bag may have a certain maximum volume of storage that may be used. When the aggregated characteristics of items in the bag approaches the capacity of the bag, the processor circuit can cause that bag to move away from the bagging position so that a new bag can be used. It will be further understood that the capacity of the bag can be expressed in a variety of terms such as the volume, weight, the maximum dimensions, and the aggregated characteristics of the scanned items can be compared to the capacity of the bag being used. For example, if bulkiness is a characteristic that is used to limit the items stored in the bag, a combination of the maximum dimension of each of the items placed in the bag can be used to determine whether the current scanned item would exceed the bulkiness capacity of the bag. If it does, the current bag could be moved away from the bagging position and a new bag could be used for the next item.

In still further embodiments according to the invention, the plurality of bagging arm segments are "telescoped" together according to the respective diameter of each of the bagging arm segments. To be actuated, the plurality of telescoped bagging arm segments are moved relative to one another as shown herein. When the bagging is complete or scanning is complete, the plurality of telescoped bagging arm segments can be retracted into a nested configuration to be ready for deployment during the next use of the self-checkout system.

Figure 1:
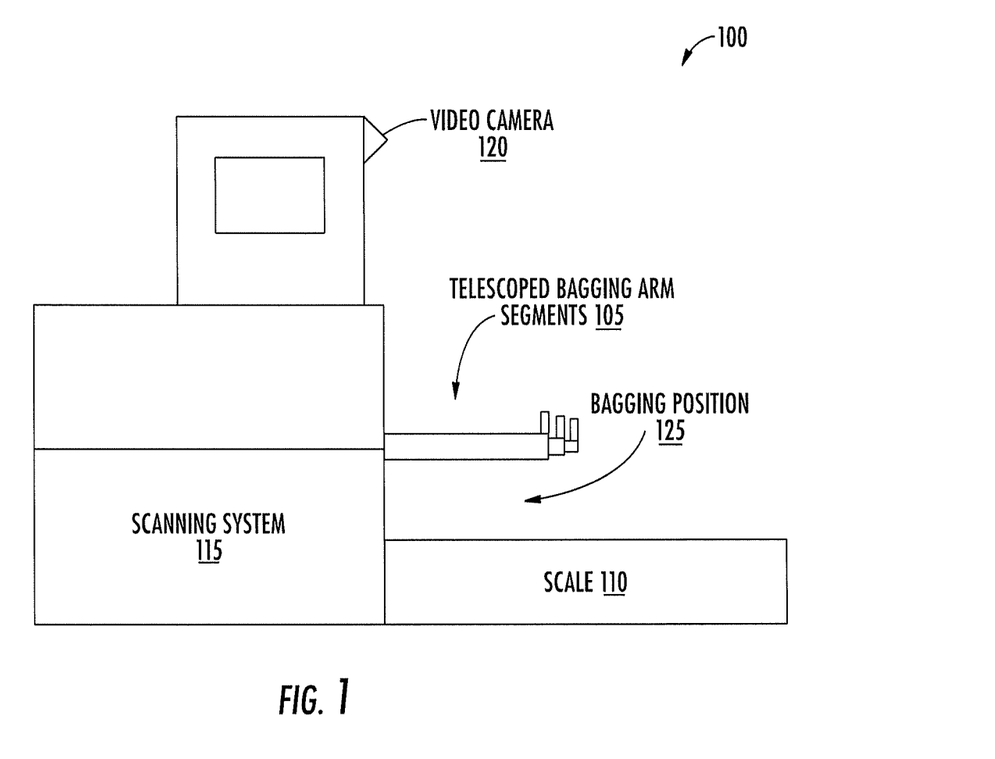
FIG. 1 is a schematic representation of a self-checkout system in some embodiments according to the invention.

FIG. 1 is a schematic representation of a self-checkout system 100 used to scan items via a scanning system 115 and bag those scanned items using a plurality of telescope bagging arm segments 105 located above a scale 110 in some embodiments according to the invention. According to FIG. 1, the items purchased by the user can be scanned using the scanning system 115 by any techniques known in the art to identify a particular item such as RFID, bar codes, image recognition (using for example a camera 120), a key pad, or the like.

As the items are scanned, characteristic information for the items is retrieved from a database whereupon the self-checkout system 100 can determine whether the current item scanned should be placed in the current bag or in a new bag based on an aggregated value of the characteristics of the items in the bag and the current item scanned. The characteristic of the item can include the bulkiness of the item, the weight of the item, the volume of the item, etc. If the self-checkout system 100 determines (based on the aggregated characteristics) that a new bag should be used, the self-checkout system 100 can move the current bag away from the bagging position 125 so that the user may place a new bag at the next contiguous one of the telescoped bagging arm segments located at the bagging position 125.

Accordingly, in some embodiments, the self-checkout system 100 can aggregate the information about each of the scanned items placed in the current bag together (with the current scanned item) so that the self-checkout system 100 can accurately determine whether a new bag should be used to hold the current scanned item. In some embodiments according to the invention, the bags storing the scanned items are maintained in contact with the scale 110 during the checkout process.

Figure 2A:
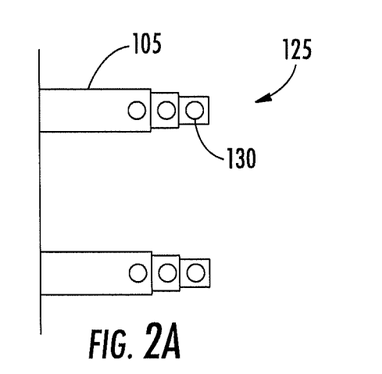
FIGS. 2A-2C are plan views of a plurality of telescoped bagging arm segments configured to extend linearly responsive to a processor circuit in some embodiments according to the invention.
Figure 2B:
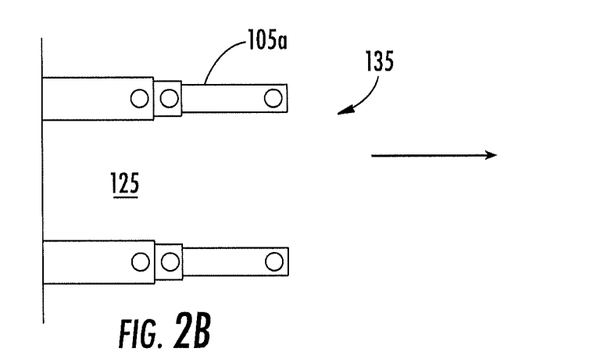
Figure 2C:
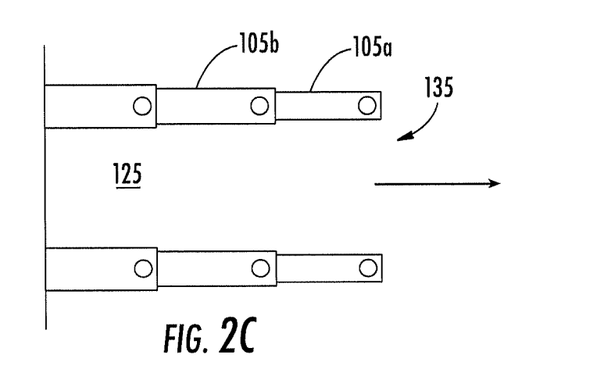

FIGS. 2A-2C are plan views of a plurality of telescoped bagging arm segments 105 in a series of positions provided by actuation of the segments relative to one another by the self-checkout system 100. According to FIG. 2A, the plurality of telescoped bagging arm segments are nested together in an initial position when the scanning for a self-checkout process begins. Accordingly, the bag for scanning can be placed at the bagging position 125 on the outermost one of the bagging arm segments. As further shown in FIG. 2A, a protrusion 130 can be located at the remote end of each of the bagging arm segments 105, which is configured to retain the corresponding bag when stationary (e.g., at the bagging position 125) and further as the bag is moved away from the bagging position 125 to allow use of a new bag.

According to FIG. 2B, the outermost one of the bagging arm segments 105a is actuated to move the current bag away from the bagging position 125 so that the new bag may be placed at the next contiguous bagging arm segment 105b presented at the bagging position 125.

As shown in FIG. 2C, the bagging arm segments 105 have again been actuated to move the bagging arm segment 105a used to hold the bag in FIG. 2B away from the bagging position 125 so that the last one of the bagging arm segments 105 can be used to hold the new bag. It will be understood that once the self-checkout process is complete and the bags are removed from the plurality of telescoped bagging arm segments, the segments can be retracted into the position shown in FIG. 2A. It will be further understood that although the configurations shown in FIGS. 2A-2C include only three bagging arm segments, any number of bagging arm segments can be used.

Figure 3:
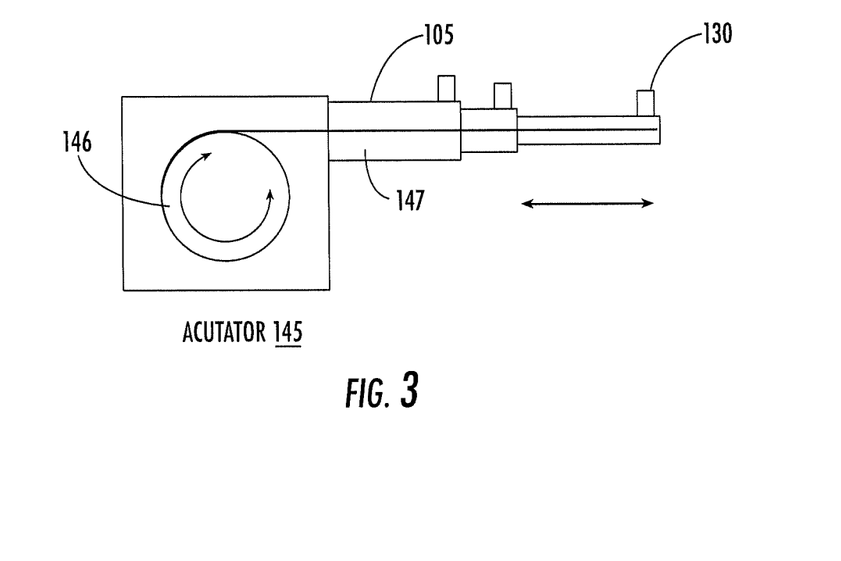
FIG. 3 is a schematic representation of an actuator that can move the plurality of telescoped bagging arm segments under control of the processor circuit in some embodiments according to the invention.

FIG. 3 is a side view of an actuator 145 operatively coupled to the plurality of telescoped bagging arm segments 105 in some embodiments according to the invention. According to FIG. 3, the actuator 145 includes a rotary member 146 and operates under the control of the self-checkout system 100 to extend and retract the plurality of telescoped bagging arm segments 105. As further shown in FIG. 3, a flexible member 147 is wrapped around the rotary member 146 and is sufficiently rigid to push/pull the movably coupled plurality of telescoped bagging arm segments 105 as described herein. Although FIG. 3 illustrates a particular arrangement of the actuator 145 and flexible member 147, other techniques may be used such as pneumatic techniques, electrical techniques, or the like.

Figure 4:
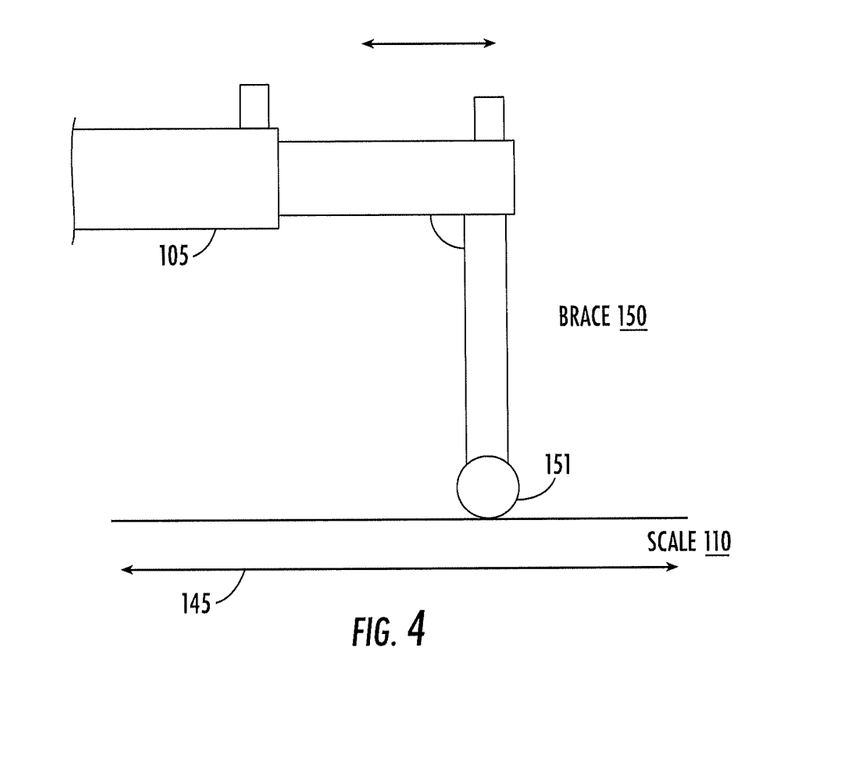
FIG. 4 is a side view of a portion of the plurality of telescoped bagging arm segments including a brace that contacts a self-checkout scale which also includes the actuator in some embodiments according to the invention.

FIG. 4 is a side view of a portion of the plurality of telescoped bagging arm segments including a brace 150 that extends from the outermost one of the telescoped bagging arm segments 105 to the scale 110 in some embodiments according to the invention. According to FIG. 4, the brace 150 is coupled to the scale 110 which may move responsive to the actuator 145 such that a portion of the scale 110 is moved during checkout. In some embodiments according to the invention, the brace 150 includes a wheel 151 that allows the plurality of telescoped bagging arm segments 105 to be moved over the scale 110 by the actuator 145 coupled to the telescoped bagging arm segments 105. It will be understood that the brace 150 may be coupled to other ones of the plurality of telescoped bagging arm segments 105.

Figure 5A:
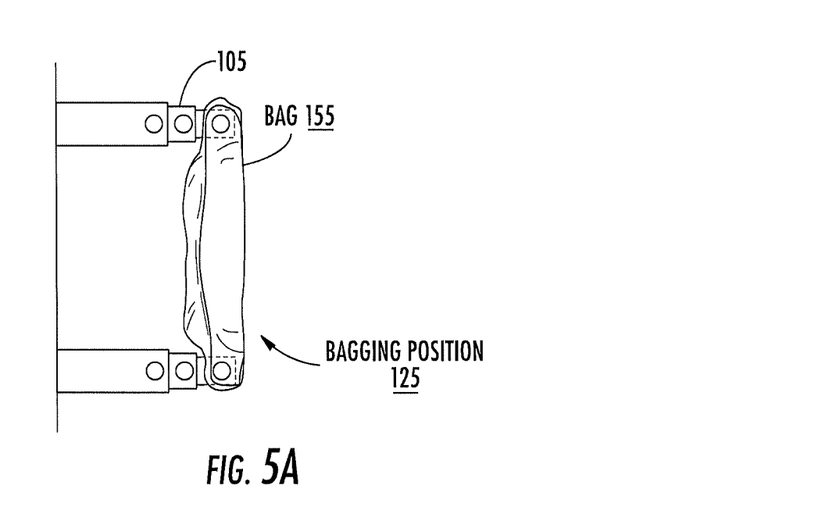
FIGS. 5A and 5B are plan views of the plurality of telescoped bagging arm segments located in a bagging position and in a position away from the bagging position in some embodiments according to the invention.
Figure 5B:
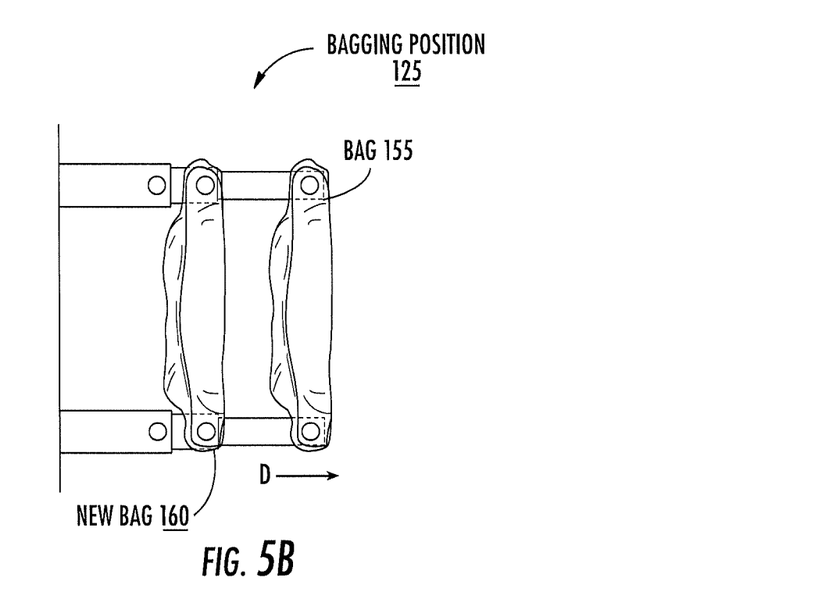

FIGS. 5A-5B are plan views of the plurality of telescoped bagging arm segments 105 having respective bags coupled thereto in the bagging position 125 and away from the bagging position 125 in some embodiments according to the invention. According to FIG. 5A, a bag 155*t* is coupled to the outermost one of the bagging arm segments 105 for storage of scanned items in the bagging position 125. In operation, when the self-checkout system 100 determines that the bag 155 stores the appropriate number of scanned items, the self-checkout system 100 can actuate the plurality of telescope bagging arm segments 105 to move the bag 155 away from the bagging position 125 to allow the user to deploy a new bag 160 on the next contiguous bagging arm segment at the bagging position 125 as shown in FIG. 5B.

Figure 6:
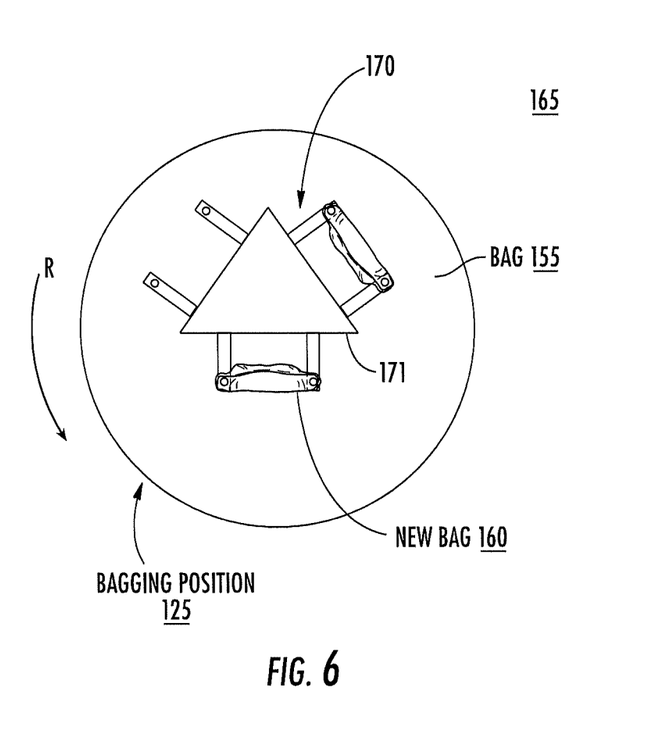
FIG. 6 is a plan view of a carousel arrangement including a plurality of bagging arm segments that are moved horizontally by an actuator coupled to the carousel under control of the processor circuit in some embodiments according to the invention.

FIG. 6 is a plan view of a rotating carousel system 165 including a plurality of bagging arm segments 170 fixed to a hub 171 in some embodiments according to the invention. According to FIG. 6, a bag 155 is positioned at a first station of the carousel 165 and a new bag 160 is positioned at a second station on the carousel. In operation, the carousel rotates horizontally in a direction R to move the plurality of bagging arm segments 170 responsive to a determination from the self-checkout system 100 that the bag 155 is at capacity (based on the aggregation of the item characteristics in the bag 155) and the new bag 160 should be used for new items as described herein.

Figure 7:
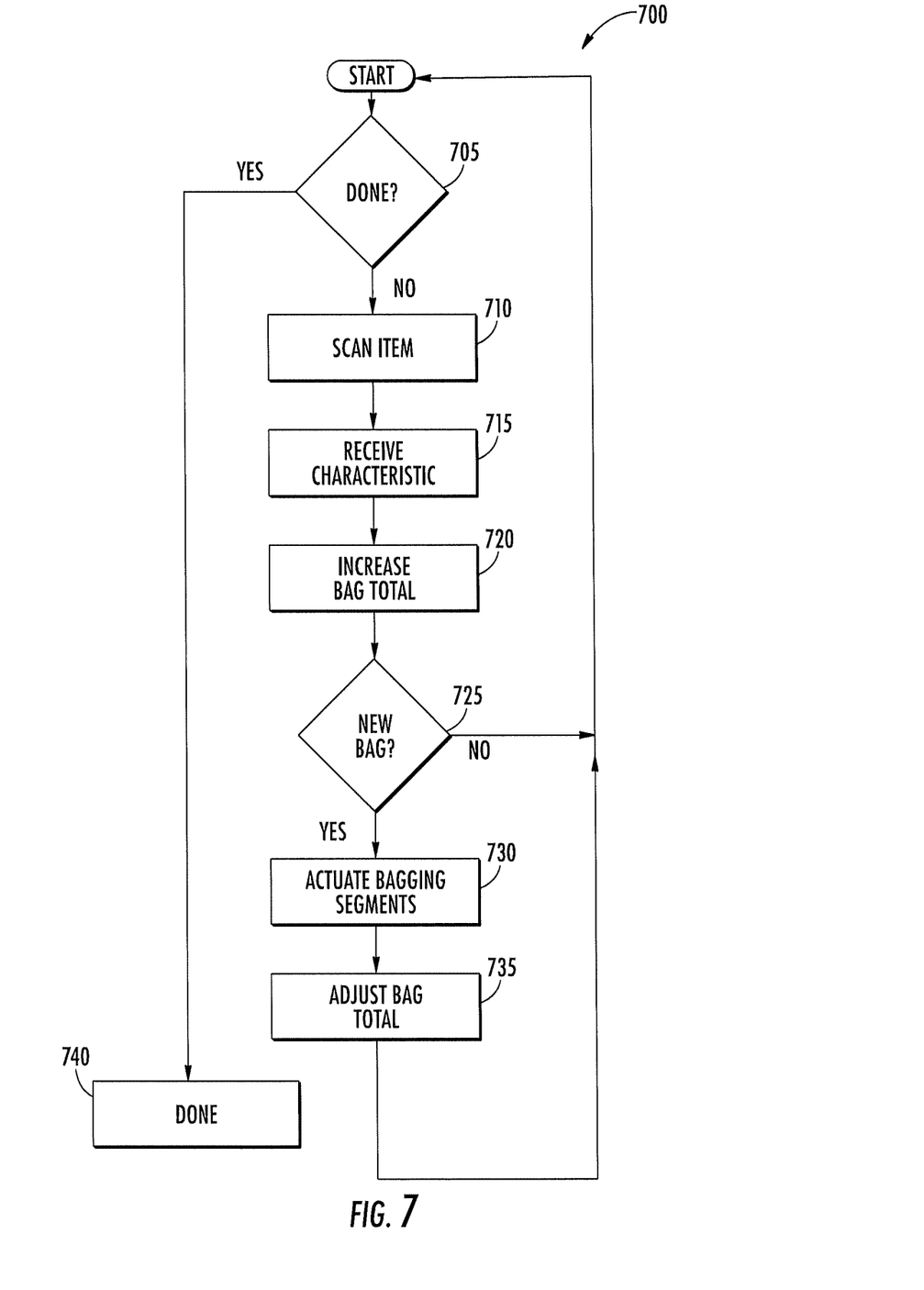
FIG. 7 is a flowchart illustrating operations of the self-checkout system in some embodiments according to the invention.

FIG. 7 is flowchart that illustrates operations of the self-checkout system 100 during a self-checkout process as described herein in some embodiments according to the invention. According to FIG. 7, the user scans an items (block 710) whereupon the self-checkout system 100 receives the characteristic of the scanned item (block 715) and aggregates the characteristic of the scanned item with the characteristics of the items previously scanned and stored in the current bag (block 720).

If the self-checkout system 100 determines that a new bag should be used for the currently scanned item (block 725) the current bag is moved away from the bagging position 125 to allow a new bag to be placed at the bagging position 125 for storage of the currently scanned item and items subsequent to the currently scanned item (block 730). Furthermore, the currently scanned item is then removed from the aggregate total of the current bag and is instead added to the aggregate of the new bag (block 735) whereupon scanning continues (block 705) until the self-checkout process is completed (block 740).

Figure 8:
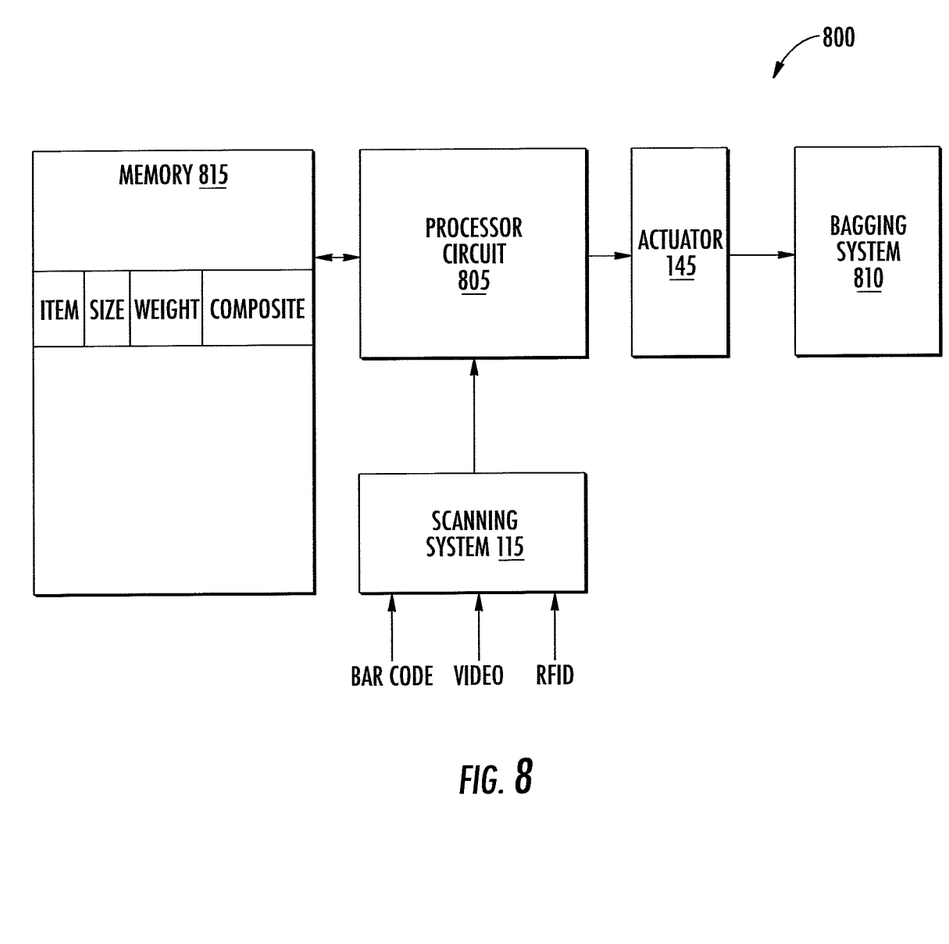
FIG. 8 is a block diagram of a system including a processor circuit used to control the bagging apparatus using information stored in a memory accessible to the processor circuit in some embodiments according to the invention.

FIG. 8 is a block diagram that illustrates a system 800 within the self-checkout system 100 that operates the scanning system 115 and the actuator 145 to move the plurality of bagging arm segments in the bagging system 810 responsive to a determination of the aggregated characteristics generated using the information stored in a memory 815 in some embodiments according to the invention. According to FIG. 8, the memory 815 stores information about the characteristics associated with each of the items scanned by the self-checkout system 100. In particular, each item can have associated characteristics such as weight, volume, bulkiness, as well as a composite representation of any combination of the characteristics described herein.

In operation, the processor circuit 805 can receive information from the scanning system 115 indicating the item scanned whereupon the processor circuit 805 accesses the memory 815 to retrieve the information associated with the scanned item. As described above, the processor circuit 805 also maintains an aggregate of the items stored in the current bag which is used to determine whether the current bag should bag be moved from the bagging position by the actuator 145 so that a new bag can be used.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

As described herein, in some embodiments a self-checkout system can include a plurality of bagging arm segments that can be moved by a processor circuit based on characteristics associated with the items scanned. In some embodiments according to the invention, the characteristics that can influence the movement of the bagging arm segments include the weight of an item that is scanned, the "bulkiness" (for example, the maximum dimension of an item that is scanned), the volume of the item scanned, a count of the items scanned or a combination of any of these characteristics. Moreover, the characteristics of the scanned items (to be placed in a bag) can be aggregated together to determine whether a new bag may be needed, whereupon the current bag may be moved away from the bagging positon to allow the user to place a new bag at the bagging position. For example, in operation, the processor circuit may maintain a record of the items that are scanned and stored in a particular bag on the scale so that the processor circuit may make an accurate determination as to whether the new bag should be used for the item being scanned or that the scanned item should be placed in the current bag. If a user has bagged a certain number or type of items which would indicate that another bag should be used for the next item to be scanned, the processor circuit can cause the bag currently being loaded in the bagging position to be moved away from the bagging position so the user can place a new bag at the bagging position and place the at scanned item into the new bag. This process can repeated until all of the items have been scanned and bagged (i.e., the self-checkout process has been competed).

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL, The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. A self-checkout system comprising:
   an extendable arm segment extending orthogonally from a base portions, wherein the extendable arm segment comprises a plurality of bag securement members positioned along its length, wherein each bag securement member is configured to support at least a portion of a respective bag,
   wherein in a first extension position of the extendable arm segment, a first bag securement member of the plurality of bag securement members is aligned with a weighing scale system such that a first bag supported by the first bag securement member is positioned vertically above the weighing scale system, wherein in a second extension position of the extendable arm segment, a second bag securement member of the plurality of bag securement members is aligned with the weighing scale system; and a processor circuit operatively coupled with the extendable arm segment and to a scanning system, the processor circuit configured to:
receive an identifier associated with a newly scanned item,
determine, based on the identifier, that the first bag satisfies a capacity threshold, and
cause the extendable arm segment to transition from the first extension position to the second extension position, wherein transitioning from the first extension position to the second extension position causes the first bag securement member to shift along a longitudinal axis of the extendable arm segment in a direction away from the base portion.

2. The self-checkout system of claim 1, wherein the identifier corresponds to at least one of a volume of the item, a weight of the item, a count of the item, or a maximum dimension of the item.

3. The self-checkout system of claim 1, wherein to determine that that the first bag satisfies the capacity threshold, the processor circuit is configured to determine that that the first bag satisfies the capacity threshold based on the newly scanned item and other items in the first bag.

4. The self-checkout system of claim 1, wherein to cause the extendable arm segment to transition from the first extension position to the second extension position, the processor circuit is configured to cause the extendable arm segment to transition from the first extension position to the second extension position based on a volume or weight capacity of the first bag.

5. The self-checkout system of claim 1, further comprising:
the weighing scale system located beneath the extendable arm segment, wherein the weighing scale system is configured to weigh the item.

6. The self-checkout system of claim 1, further comprising:
an actuator coupled to the extendable arm segment, the actuator configured to linearly extend the extendable arm segment into any of a plurality of extension positions, wherein the plurality of extension positions comprises at least the first extension position and the second extension position.

7. The self-checkout system of claim 1, wherein the extendable arm segment comprises a first and second extendable arm segment located on respective sides of the first bag.

8. The self-checkout system of claim 1, further comprising:
a brace coupled to a remote end of the extendable arm segment, the brace extending to contact the weighing scale system.

9. The self-checkout system of claim 1, further comprising:
a plurality of retaining protrusions, wherein the plurality of retaining protrusions protrudes vertically from the extendable arm segment.

10. The self-checkout system of claim 1, wherein the extendable arm segment is configured to hold a plurality of bags while the extendable arm segment is moved.

11. The self-checkout system of claim 1, wherein the processor circuit is further configured to, responsive to the identifier of the item, move the extendable arm segment to move the first bag away from the first extension position to the second extension position.

12. The self-checkout system of claim 1, wherein the processor circuit is further configured to filter weighing by the weighing scale system during movement of the extendable arm segment.

13. The self-checkout system of claim 1, wherein in the second extension position of the extendable arm segment, the first bag securement member is positioned along the longitudinal axis of the extendable arm segment in the direction away from the base portion.

14. The self-checkout system of claim 1, wherein in the second extension position of the extendable arm segment, the first bag securement member is not aligned with the weighing scale system.

15. A bagging system apparatus comprising:
an extendable arm segments extending orthogonally from a base portion;
a plurality of bag securement members positioned along a length of the extendable arm segment, wherein each bag securement member is configured to support at least a portion of a respective bag; and
an actuator operatively coupled to the extendable arm segment and configured to move the extendable arm segment in a plurality of extension positions by causing the extendable arm segment to extend or retract,
wherein in a first extension position of the plurality of extension positions, a first bag securement member of the plurality of bag securement members is aligned with a weighing scale system such that a first bag supported by the first bag securement member is positioned vertically above a weighing scale system, and
wherein in a second extension position of the plurality of extension positions, a second bag securement member of the plurality of bag securement members is aligned with the weighing scale system such that a second bag supported by the second bag securement member is positioned vertically above the weighing scale system and the first bag securement member of the plurality of bag securement members is not aligned with the weighing scale system such that the first bag is not positioned vertically above the weighing scale system.

16. The bagging system apparatus of claim 15, wherein the extendable arm segment comprises a plurality of telescoped bagging arm segments moveably coupled together in an order according to respective diameters of the plurality of telescoped bagging arm segments.

17. The bagging system apparatus of claim 15, further comprising:
the weighing scale system located beneath the extendable arm segment.

18. A non-transitory computer-readable medium whose contents, when executed by a computing system, cause the computing system to perform operations for a self-checkout bagging system, comprising:
receiving an identifier associated with a scanned item in use with a self-checkout system for placement into an available bag of a plurality of bags during a self-checkout process;
determining, based on the identifier and a plurality of other identifiers associated with other items previously placed within a first bag, that that the first bag satisfies a capacity threshold, and
causing an extendable arm segment to extend along a longitudinal axis to transition the extendable arm segment from a first extension position to a second extension position, wherein in the first extension position a first bag securement member positioned in a first location along a length of the extendable arm segment is aligned with a weighing scale system such that the first bag is positioned vertically above a weighing scale system, wherein in the second extension position a second bag securement member positioned in a second location along the length of the extendable arm segment is aligned with the weighing scale system such that a second bag is positioned vertically above the weighing scale system and the first bag is not positioned vertically above the weighing scale system, wherein extension of the extendable arm segment from the first extension position to the second extension position causes the first bag securement member to shift along the longitudinal axis of the extendable arm segment.

19. The non-transitory computer-readable medium of claim 18, further comprising:

associating the identifier with the second bag based on a determination that the scanned item was placed into the second bag.

20. The non-transitory computer-readable medium of claim 18, wherein the identifier corresponds to a size of the scanned item.

* * * * *

UNITED STATES PATENT AND TRADEMARK OFFICE
CERTIFICATE OF CORRECTION

PATENT NO. : 11,574,295 B2
APPLICATION NO. : 16/274523
DATED : February 7, 2023
INVENTOR(S) : Makley et al.

It is certified that error appears in the above-identified patent and that said Letters Patent is hereby corrected as shown below:

In the Claims

Column 8, Claim 1, Line 57: Please correct "a base portions" to read -- a base portion --

Column 10, Claim 15, Line 16: Please correct "extendable arm segments" to read -- extendable arm segment --

Signed and Sealed this
Nineteenth Day of December, 2023

Katherine Kelly Vidal
*Director of the United States Patent and Trademark Office*